Sept. 28, 1971     G. A. WALTON ET AL     3,608,352
ULTRASONIC TRANSDUCERS
Filed Dec. 4, 1968     3 Sheets-Sheet 1
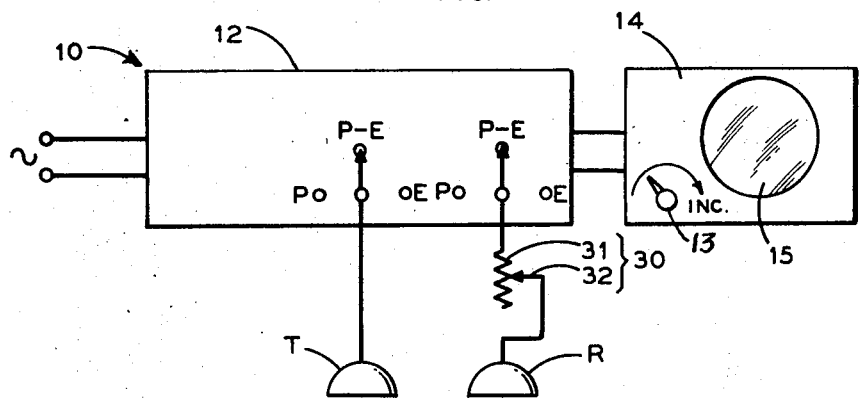
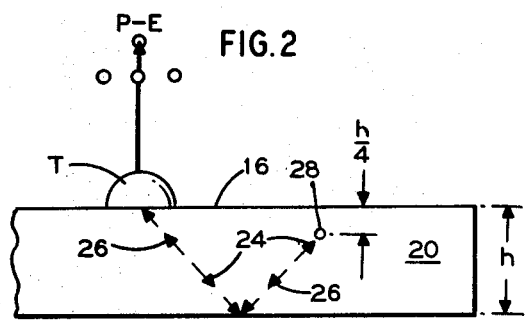
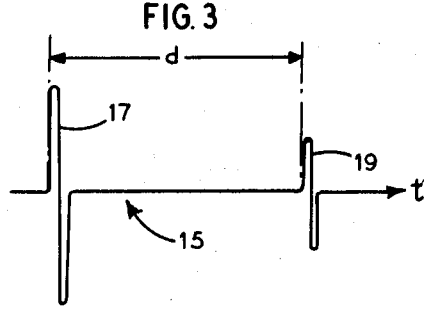
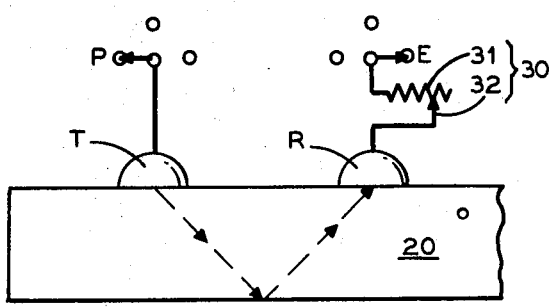
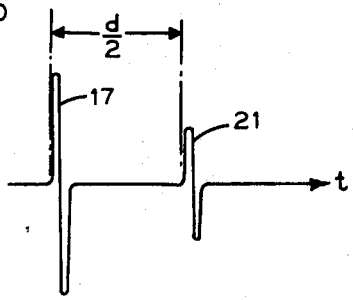
INVENTORS
Glenn A. Walton
Gilbert R. Forrer
BY *J. Maguire*
ATTORNEY Sept. 28, 1971    G. A. WALTON ET AL    3,608,352
ULTRASONIC TRANSDUCERS
Filed Dec. 4, 1968    3 Sheets-Sheet 3

3,608,352
ULTRASONIC TRANSDUCERS
Glenn A. Walton, Wadsworth, and Gilbert R. Forrer, Barberton, Ohio, assignors to The Babcock & Wilcox Company, New York, N.Y.
Filed Dec. 4, 1968, Ser. No. 780,955
Int. Cl. G01n 29/04
U.S. Cl. 73—1R  2 Claims

ABSTRACT OF THE DISCLOSURE

A method of calibrating an ultrasonic transducer to inspect a workpiece for flaws. The transducer to be calibrated is mounted on a metal block having a reference such as a cavity from which ultrasonic waves may be reflected. The transducer is energized to transmit a wave into the block and a reference signal obtained due to the wave being reflected from the obstacle. A second transducer is then mounted on the block and a signal obtained due to a wave being received by the second transducer. Both transducers are then mounted on the workpiece to be inspected and a signal is again obtained due to the wave being received by the second transducer. A comparision is made between the signals due to waves received by the second transducer to adjust the reference signal for inspecting the workpiece.

BACKGROUND AND SUMMARY OF THE INVENTION

Ultrasonic waves may be rectilinearly propagated in homogeneous materials. Since inhomogeneities or obstacles in the path of propagation reflect the waves, such obstacles may be readily located; and since the waves are reflected to a greater or lesser extent depending on the relation of the wavelength to the size of the obstacles encountered, the size of the obstacle may be determined, e.g., if the wavelength is small compared to the obstacle, the amplitude of the reflected wave is large, whereas if the wavelength is large compared to the size of the obstacle, the amplitude of the reflected wave is small.

As a result, a common method of inspecting purportedly homogeneous elastic materials for flaws is to transmit an ultrasonic wave into the material, note the length of time it takes for the wave to be reflected from a flaw in the path of transmission, and note the amplitude of the reflected wave. The location of the flaw may be calculated, for the velocity of propagation of ultrasonic energy in various media are known. But the amplitude of the reflected wave has heretofore been directly compared to the amplitude of a wave which would be returned from an obstacle of known size in a particular material.

Flaws are relatively easily located by the echo principle extensively used in sonar and radar. A transducer, coupled to the workpiece for transmitting ultrasonic energy into the workpiece, is energized by a pulse generator adjusted to emit pulses at a predetermined rate. The sweep of an oscilloscope, or scope, is synchronized with the pulses to repeatedly display them one after the other in the same position on the face of the scope so that a single transmitted pulse appears to be displayed. The transducer is moved across the workpiece until a reflection is received, indicating a flaw has been discovered, and then held stationary as successive pulses are reflected from the flaw. The reflected waves are received by the scope via the transducer and pulse generator and displayed in another fixed position on the face of the scope, their images reinforcing one another so that only one received signal appears to be persistently displayed. The transmitted and received signals are separated from one another on the time scale etched into the face of the scope by a distance which is proportional to the distance between the transducer and flaw, as measured along the path of transmission of ultrasonic energy. Consequently, the distance may be readily calculated as already indicated.

In order to calibrate the equipment and particularly the transducer to ascertain the size of the flaw by direct comparison techniques, it has been necessary to form one or more cavities of known dimension to simulate flaws in the workpiece itself or, when it is not desirable to form a cavity in the workpiece, in a separate block of the same material as the workpiece. The amplitudes of the reflections from the cavity or cavities, as the case may be, and those subsequently obtained from flaws within the workpiece, are directly compared. The cavity used to simulate a flaw or defect is usually a V-shaped notch or drilled hole, cut into a surface of the workpiece or calibration block to a depth of say 5% of its thickness, the thickness of the calibration block being equal to that of the workpiece. If the thickness of the workpiece is different at several test locations of the transducer, the transducer has heretofore been re-calibrated on a calibration block of the same thickness as the workpiece at the particular location to obtain reliable data. Thus to completely inspect a given workpiece a plurality of calibration blocks have been required, the inventory of calibration blocks being still further increased if a workpiece is fabricated from different materials since additional blocks made of each of the materials are provided. The complete inventory of blocks for a particular inspection job had to be transported to an inspection site because the ultrasonic equipment cannot be moved after it is calibrated or even energized from a different source of current without alteration of its response characteristics. In fact, transducer calibration is checked both before and after inspection to verify that there has been no change in calibration during the inspection. With workpieces such as industrial pressure vessels and nuclear reactors becoming larger, and as a consequence thicker and heavier, the calibration blocks have become correspondingly thicker and heavier.

In view of the foregoing, it should be appreciated that there has been a long felt need for a means of accurately and reliably calibrating ultrasonic equipment at an inspection site utilizing a method which does not require extensive inventory of huge and unwieldy calibration blocks or the alternative necessity of forming calibration cavities in the workpiece itself. To meet this need there is disclosed herein a new method of calibrating an ultrasonic transducer, of the type used for inspecting elastic materials. As is hereinafter more fully described, the transducer may now be calibrated as follows:

The transducer is mounted on a calibration block made of elastic material having formed therein an obstacle which simulates a defect of known dimension, and energized to transmit an ultrasonic wave into the material. When the wave reflected by the obstacle is received at the transducer, it is displayed on the scope, where its amplitude is adjusted to a primary reference amplitude. The transducer is then moved back from the obstacle so that it transmits the ultrasonic wave to an ultrasonic receiver mounted on the block a given nodal distance from the transducer. A variable impedance in the line connecting the receiver to the scope is adjusted to display the signal received at a convenient secondary reference amplitude. The transducer and receiver are then mounted on the workpiece to be inspected, where they are spaced apart from one another whatever distance is required according to the thickness of the workpiece for spacing them the same nodal distance apart on the workpiece as they were when mounted on the calibration block. The ultrasonic wave is again transmitted to the receiver. The received signal is transmitted to the scope through the impedance as previously adjusted. The gain of the scope is then adjusted to display the received signal at the secondary reference level. If the receiver is now removed from the workpiece and the transducer used to scan the workpiece, an obstacle of the same size located the same nodal distance from the transducer as the obstacle in the calibration block was located from the transducer when the primary reference amplitude was fixed, will give rise to a reflected wave having the primary reference amplitude. Accordingly, the transducer had been calibrated for examining a particular workpiece without the benefit of a calibration block of the same material and thickness as the workpiece, and without forming an obstacle in the workpiece.

The invention is a method of calibrating an ultrasonic transducer to inspect a workpiece for flaws and comprises the steps of mounting the transducer to be calibrated on an elastic material provided with a flaw, energizing the transducer to transmit an ultrasonic signal into the material, obtaining a reference indication due to the signal being reflected from the flaw, mounting a second transducer on the material, obtaining an indication due to the ultrasonic signal being detected by the second transducer, mounting both transducers on the workpiece to be inspected, energizing the transducer to be calibrated to transmit a second ultrasonic signal into the workpiece, obtaining a second indication due to the second ultrasonic signal being detected by the second transducer, comparing the indications due to ultrasonic signals detected by the second transducer, and adjusting the reference indication in consideration of the comparison.

BRIEF DESCRIPTION OF THE DRAWINGS

FIG. 1 is a schematic diagram of ultrasonic equipment,

FIG. 2 is a schematic diagram illustrating a means of detecting a flow in a material, FIG. 3 is an oscillogram illustrating a time based input and output signal for the ultrasonic equipment of FIG. 1 as used in FIG. 2, FIG. 4 is a schematic diagram illustrating a means for detecting an ultrasonic signal in a material, FIG. 5 is an oscillogram illustrating a time based input and output signal for the ultrasonic equipment of FIG. 1 as used in FIG. 4.

DESCRIPTION OF THE PREFERRED EMBODIMENTS

Figure 6:
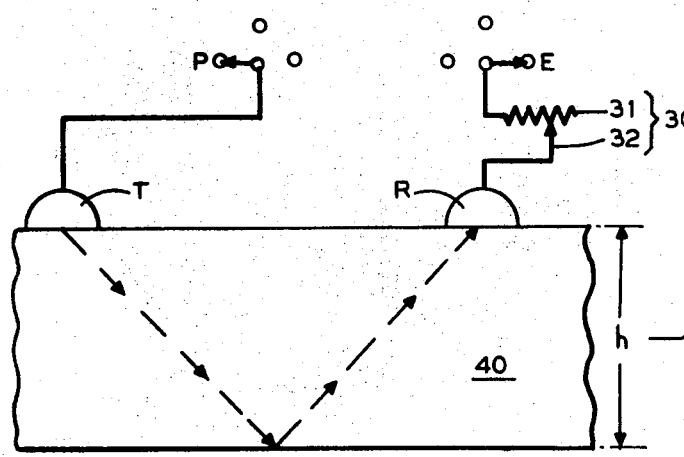
FIG. 6 is a schematic diagram illustrating a means of detecting a flaw in a workpiece.

Referring now to the drawing wherein like reference numerals designate like or corresponding parts throughout the several views, there is shown in FIG. 1 an arrangement of ultrasonic testing equipment 10 which basically comprises a high frequency pulse generator 12 electrically connected to an oscilloscope 14 and provided with means for energizing an ultrasonic transducer T, or transducers T and R. As shown in FIG. 2, transducer T is preferably an angle beam transceiver which is mountable on the surface 16 of a homogeneous elastic material 20 for transmitting ultrasonic waves 24 into the material and receiving waves 26 reflected from an inhomogeneity 28 in the material. However, as shown in FIG. 4, transducer R need only be an ultrasonic wave receiver mountable on the material 20 for receiving waves from the transceiver T via the material 20. The pulse generator 12 may be any type of generator well known in the art for driving ultrasonic transducers of the type used for inspecting homogeneous elastic materials, and the scope is assumed to have a linear response characteristic over the range of frequencies commonly utilized for such inspections. A commercially available Refectoscope, housing a pulse generator 12 and scope 14 in a common cabinet, has been utilized to perform steps of inventive process. Accordingly, the process is hereafter described assuming those skilled in the art are familiar with the internal circuitry of such an instrument and the aforementioned equipment 10 or may readily obtain such information. See for example, U.S. Pat. No. 2,280,226 issued to F. A. Firestone, Apr. 21, 1942.

The mode of operation of the equipment 10 with which those skilled in the art are best acquainted, is a pulse-echo technique for locating flaws. As shown in FIG. 1 supplemented by FIG. 2 the pulse generator is adjusted to key the transducer T with an electrical signal of appropriate frequency, amplitude and duration; which is monitored by the scope 14 and converted by the transducer into vibratory motion for propagation within the material as an ultrasonic wave proportional to the signal 17 (FIG. 3) displayed on the face 15 of the scope. The sweep circuit of the scope is adjusted to be synchronized with the leading edge of the initially transmitted signal 17, which acts as a starting point from which time is measured on the face of the scope. As shown in FIG. 2, when the ultrasonic wave encounters an inhomogeneity 28 in the material such as a flaw or other obstacle, a portion of the wave is reflected from the boundary of the obstacle and returned to the transducer T where it is converted into a signal 19 (FIG. 3), which is proportional to the reflected wave, for display on the scope face at some time interval after the transmitted signal is displayed. The time lapse between transmitted and received signals 17, 19 respectively causes them to be spaced apart from one another on the face of the scope. Since the spacing is proportional to distance between the transducer and obstacle, as measured along the path of propagation of the ultrasonic wave, the time scale $t$ on the face of the scope may be suitably adjusted for directly reading this distance $d$, as shown in FIG. 3.

Figure 9:
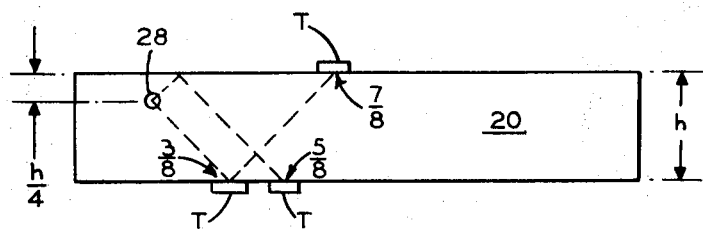
FIG. 9 is a schematic diagram illustrating a means for obtaining information to construct a distance-amplitude curve.
Figure 10:
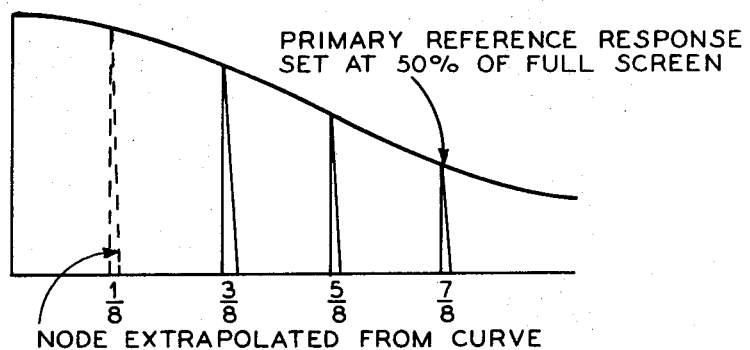
FIG. 10 is a distance amplitude curve.

In order to calibrate the transducer to determine the size of the defect in the workpiece, the transducer is usually mounted on a sample of the material which is provided with a defect of known size which acts as a reference inhomogeneity. A record is made of the amplitude of the waves reflected from the reference for comparison with those reflected from flaws in the workpiece. FIG. 2 may be used to illustrate the technique. Assume the elastic material 20 of FIG. 2 is a reference or calibration block made of the same material as that of the workpiece and is of the same thickness, or height $h$, as the workpiece. In addition, assume the simulated flaw 28 is a one-eighth inch diameter hole drilled to a depth of one and one-half inches into the side of the block at right angles to the direction of propagation of wave 24, and the axis of the hole lies in a plane parallel to the top surface of the block and is spaced a distance of one-fourth of $h$ from the top surface of the block. The signal due to the wave reflected from the hole is displayed on the scope at a convenient reference amplitude and the transducer is calibrated on the reference hole while maintaining the output of pulse generator 12 constant. As shown in FIG. 9 the amplitude of the wave reflected from the reference hole 28 may be recorded for several different positions of the transducer on the calibration block 20, and a distance-amplitude curve constructed as shown in FIG. 10. The significance of the fractions shown in FIGS. 9 and 10 will be fully explained later. Subsequently, the transducer is mounted on the workpiece to scan for flaws. Assuming a flaw is discovered, the distance between the transducer and flaw may be calculated as hereinbefore indicated, and the amplitude of the wave reflected from the flaw may be directly compared to the amplitude of the wave reflected from a one-eighth inch diameter hole located the same distance from the transducer by referring the amplitude of the wave reflected from the flaw to the amplitude-distance curve. If, for example, a reflection from a one-eighth inch diameter hole represents the greatest acceptable flaw, the transducer may be used as a no-go gage during the inspection process.

In prior art, the calibration block and its thickness must be the same as that of the workpiece. Each workpiece inspection job generates a new set of calibration blocks which cannot be resized for a later job since they must be maintained for re-use to repeat previous inspections. With the following method a single calibration block of a given material may be used for calibrating a transducer for any number of inspection jobs.

To simplify the discussion, and particularly the drawings, it has been assumed that transducers T and R are each connected to the pulse generator 12 via a three position switch; each switch having Pulse (P), Pulse Echo (P-E) and Echo (E) positions as shown in FIG. 1. In the Pulse-Echo position (P-E), pulses from the generator are fed to the scope and to the transducer associated with the particular switch, and signals due to waves received by the transducer are connected via the pulse generator to the scope. In the pulse position (P), pulses from the generator are fed to the scope and to the transducer, but signals due to waves received by the transducer are not connected to the scope. In the Echo position (E), pulses from the generator are not fed to the transducer, but signals due to waves received by the transducer are connected to the scope.

In addition, those skilled in the art will recognize that the near field effects must be avoided to ensure proper calibration of a transducer according to the invention. Accordingly, it is assumed that the transducers T and R are spaced apart from one another whatever nodal distance is required to avoid the effect of near fields, or the near field effects are otherwise compensated for by means well known in the art to ensure proper calibration of the transducer.

Also it is understood that angle beam ultrasonic transducers predominately propagate shear waves within the elastic materials. However, although the invention is described utilizing such transducers, those skilled in the art will recognize that transducers mounted for predominantly propagating longitudinal waves within elastic materials may also be calibrated by the method of the invention without departing from the spirit and scope of the invention.

Utilizing the inventive method of calibration, it has been experimentally proved that the reference block upon which the transducer T is initially calibrated may be of a different material than that of the workpiece, have a different surface texture than the workpiece, and be of a different thickness than the workpiece. For example, transducers have been initially calibrated on an aluminum reference block measuring one inch in thickness, and later used to scan for flaws in a steel workpiece measuring six inches in thickness, and the results of the scan have been repeatedly verified experimentally.

In a preferred embodiment of the invention, an angle beam transducer of the type used for inspecting elastic materials is first mounted on the upper surface or side 16 of a calibration block made of a suitable elastic material 20 having a simulated reference inhomogeneity or defect 28 which will be assumed to be the one-eighth inch diameter side-drilled hole described earlier. As shown in FIG. 2, the transducer is then energized to cause a shear wave of ultrasonic energy to be propagated within the workpiece. The wave is propagated downwardly and at an angle with respect to the upper surface of the material, interiorly deflected from the lower surface of the material, and returned toward the upper surface in a zig-zag fashion. When the wave encounters the inhomogeneity, a portion of the wave 26 is reflected back to the point of deflection, where it is again deflected and beamed to the transducer. The amplitude of the scope signal due to the reflected wave as received by the transducer is adjusted to a convenient primary reference level by manipulating the vertical gain control 13 of the scope. For example, the primary reference level may be set at 50% of full height of the face of the scope. After the adjustment, a series of amplitude-distance readings may then be taken, and the distance-amplitude curve of FIG. 10 constructed.

The horizontal distance as measured from the point where the wave commences propagation within the material to the first deflection point at the lower surface is known in the art as a half-node distance. The first point of deflection at the lower surface of the material is known as the first half-node point. If the one-eighth inch hole were not formed in the material at the location indicated, the upwardly deflected wave 24 would be interiorly deflected at the upper surface and returned to the lower surface, where it would again be deflected, and so on, the points of deflection after the first half-node point being respectively known as the first node point and one and one half-node node point, and so on, with full node points being located at the upper surface and half-node points being located at the lower surface. The distance from the transducer T to the reference inhomogeneity is usually expressed in terms of the number of eights of a node the transducer is distant from the inhomogeneity. Thus transducer T of FIG. 2 is located seven-eighths of a node distant from the one-eighth inch diameter side-drilled hole in the calibration block 20. The fractional values shown in FIGS. 9 and 10 also indicate nodal reference distances, the primary reference level for the particular curve having been obtained with the transducer located at the seven-eights node.

Assume the amplitude of signal due to the reflected wave has been adjusted to a primary reference level. The transducer T could now be used to scan a workpiece of the same material, thickness and surface texture as the calibration block. If the transducer is to be used to scan a workpiece made of a different material, thickness and/or surface texture, the reference level must be readjusted. In prior art this is done by recalibrating the transducer on an appropriate calibration block. However, according to the invention, a different procedure may be used to transfer the calibrated transducer T to any other elastic material to be inspected.

To transfer the calibration to a workpiece made of a different material or having different dimensions and/or to repeatedly readjust the reference level for any workpiece whenever necessary, the initially calibrated transducer T may be moved away from the inhomogeneity 28 as shown in FIG. 4, whatever distance is required to mount a second transducer R on the upper surface 16 of the calibration block at the first full-node point of the impedance 30. The switch associated with the transducer R need only be an ultrasonic wave receiver, however a transducer in all respects similar to transducer T has been used to practice the invention. Transducer R is connected in series to the switch of the pulse generator via a variable impedance 30. The switch associated with the transducer R is preferably switched to the Echo (E) position, as shown in FIG. 4, so that transducer R receives waves from the workpiece but does not transmit pulses thereinto. Contrariwise, the switch associated with transducer T is preferably switched from the Pulse-Echo (P-E) position to the Pulse (P) position as shown in FIG. 4, so that transducer T transmits but does not receive. Transducer T is then energized with a signal of the same amplitude and frequency as the signal which was used during the initial calibration procedure. The wave transmitted by transducer T is interiorly deflected to the first full-node point at the upper surface of the block where it is received by transducer R, and converted into an electrical signal 21 (FIG. 5) proportional to the wave for display on the scope.

It is possible, but not probable, that signal 21 will have a convenient amplitude for reference purposes. However, a variable impedance, representatively shown in the drawings as a variable resistor, is provided to adjust the amplitude of the scope signal to any convenient reference level. This reference level will hereafter be referred to as the secondary reference level. The signal may be adjusted to the same level chosen as the primary reference level, in which case, information as to the amplitude of the response which would be received from a one-eighth inch diameter hole formed in the calibration block at the position shown in FIG. 4 is stored in the variable impedence. The reference level chosen may be taken from the distance-amplitude curve, as for example, the amplitude of the response received from the one-eighth inch hole which is one full-node removed from the transducer. This value may be obtained from the FIG. 10 curve and stored in the variable impedance. It should be noted that the gain control 13 of the scope is not disturbed during this procedure, but remains at the setting it was turned to when the signal due to the wave reflected from the hole was adjusted to the primary reference level. Whatever secondary reference signal is decided upon as being convenient has no effect on the initial calibration of the transducer T.

Having adjusted the variable impedance, both transducers T and R are then dismounted from the calibration block and mounted on the workpiece. As shown in FIG. 6, the workpiece 40 is thicker, i.e. the dimension "h" is larger than the corresponding dimension of the calibration block 20. The workpiece may additionally be made of a different material or have a different surface texture, or both. The transducers T and R are preferably mounted on the surface of the workpiece and spaced apart from one another such that transducer R is mounted at the first full-node point of the ultrasonic wave transmitted into the workpiece by transducer T. Tranducer T is again energized with a signal of the same amplitude and frequency as the signal which was used during the initial calibration procedure. Further, the switch associated with transducer T is maintained in the Pulse position while the other switch is maintained in the Echo position. The wave transmitted by transducer T is interiorly deflected within the workpiece to the first full-node point at the upper surface of the workpiece where it is received by transducer R and converted into an electrical signal 41 (FIG. 8) proportional to the wave for display on the scope.

Figure 7:
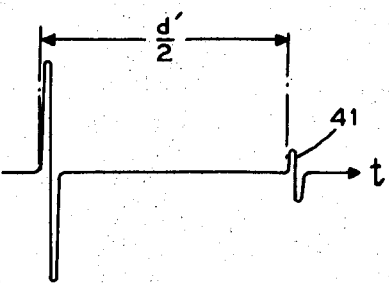
FIG. 7 is an oscillogram illustrating a time based input and output signal for the ultrasonic equipment of FIG. 6.
Figure 8:
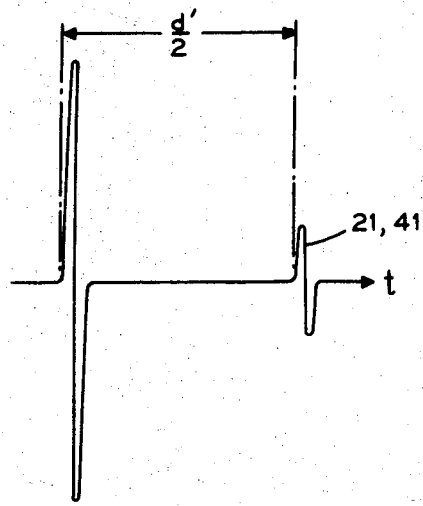
FIG. 8 is an oscillogram illustrating the time based input and output signal of FIG. 7 after adjustment.

The difference between the amplitude of signal 41 (FIG. 7) and secondary reference signal 21 (FIG. 5) is due to the difference in thickness, surface texture and/or material of the workpiece as compared to the calibration block. It has been experimentally proven that if the gain control of the scope is now adjusted to restore the amplitude of signal 41 to the level of the secondary reference signal 21, as shown in FIG. 8, the initial calibration of transducer T is thereby transferred to the workpiece. Thus the indications due to ultrasonic signals being detected by the transducer R are compared with one another and the reference indication 19 due to a signal being reflected from a known flaw is adjusted in consideration of the comparison. If the distance-amplitude curve of FIG. 10 was constructed after initially calibrating transducer T it may be used without modification for the workpiece. If different sections of the workpiece are thicker or thinner then the area upon which the transducers T and R are originally mounted the calibration may be readjusted for scanning such sections by repeating the steps of the procedure subsequent to the step of dismounting the transducers from the calibration block.

It should be appreciated that although the invention is described utilizing an oscilloscope as a means for obtaining a reference indication due to an ultrasonic signal being reflected within the elastic material or as the means for obtaining an indication due to an ultrasonic signal being detected by the receiving transducer, other indicating means well known in the art may be used without departing from the spirit and scope of the invention.

It was hereinbefore indicated that information as to the amplitude of the response which would be received from a hole of a particular size may be stored in the variable impedance. If a given calibration block were provided with a plurality of holes of different sizes the variable impedance could be used to store information pertaining to the amplitude of the response received from each hole. Thus the variable impedance is itself susceptable to being calibrated. For example, assume the variable impedance used is the variable resistor 30 having fixed 31 and movable 32 portions as shown in FIGS. 1, 4 and 6. After adjusting the movable portion 32 of the resistor to bring the secondary reference level into correspondence with the primary reference level for a one-eighth hole, it may thereafter be adjusted to another position to obtain a secondary reference level corresponding to the primary response from a three-sixteenths inch hole located the same nodal distance from the transducer. The position at which the movable portion 32 of resistor comes to rest on the fixed portion 31 thereof for a plurality of different sized holes may be marked on the fixed portion of the resistor, the size of the particular hole corresponding to the particular position. Thus a scale of hole sizes or discontinuities may be affixed to the fixed portion of the resistor. Thereafter, when a flaw is discovered in a workpiece, its size may be determined by simply adjusting the movable portion of the variable resistor to obtain the primary reference response on the scope and reading the hole size off the scale. A series of distance-amplitude curves may be constructed as hereinbefore indicated, one for each hole size marked on the scale, if desired.

What is claimed is:

1. A method of calibrating an ultrasonic transducer to inspect a workpiece for flaws, the transducer being adapted to transmit ultrasonic signals at a set selected amplitude and frequency, which comprises the steps of coupling the transducer to be calibrated to a standard body of elastic material provided with a reference flaw, energizing said transducer to transmit a first ultrasonic signal into said body along a beam path intercepting the reference flaw to obtain an ultrasonic echo signal therefrom, detecting said echo signal with said transducer and displaying the detected echo signal upon an indicator at a selected reference amplitude scale, measuring the time delay between said transmitted and echo signals and the nodal distance between the coupling point of the transducer and the reference flaw, coupling a receiver to said standard body to receive at a selected nodal distance from said transducer a second ultrasonic signal transmitted thereby along another beam path not intercepting the reference flaw, energizing the transducer to transmit to said receiver the second ultrasonic signal for detection thereby, displaying the second signal as detected by said receiver upon said indicator, adjusting the gain between the receiver and indicator to display said detected second signal at a selected amplitude, coupling both said transducer and receiver to the workpiece at locations spaced apart by the same nodal distance as on said standard body, energizing said transducer to transmit through the workpiece a third ultrasonic signal for detection by the receiver, and adjusting the amplitude scale of said indicator while holding the gain between the receiver and indicator to display the third signal as detected by the receiver at substantially the same amplitude as the detected second signal received through the standard body, whereby with such indicator amplitude scale and receiver to indicator gain settings an echo signal from a flaw in the workpiece having the same size and located the same nodal distance from the transducer as the reference flaw in the standard body is displayed on the indicator at the same amplitude as the echo signal from the reference flaw.

2. A method of recalibrating a calibrated ultrasonic transceiver transducer to inspect a workpiece for which the transceiver is not calibrated, the calibrated transceiver being adapted to transmit signals at a set selected frequency and amplitude, and adapted to detect an echo signal from a flaw in an elastic body for which the transceiver is calibrated and to display the detected echo signal at a selected amplitude and position on an indicator, the displayed amplitude and position representing the size and location of the flaw in the body with respect to the position of the transceiver on the body, comprising the steps of mounting a receiver transducer on the body at a selected nodal distance from the transceiver to receive a first signal transmitted by the transceiver, energizing the transceiver to transmit to the receiver the first signal for detection thereby, detecting the first signal with the receiver, adjusting the gain between the receiver and the indicator to display the detected first signal at a selected amplitude, removing the transceiver and receiver to positions on the workpiece for which the transceiver is to be recalibrated, the transceiver and receiver being spaced apart by the same nodal distance as on the body, energizing the transceiver to transmit a second signal for detection by the receiver, detecting the second signal with the receiver, and adjusting the amplitude scale of the indicator while holding constant the gain between the receiver and the indicator to display the detected second signal at the same amplitude as the detected first signal, whereby the transceiver is recalibrated so as to display an echo signal from a flaw in the workpiece on the indicator at the same amplitude as an echo signal from a flaw of the same size and having the same nodal distance from the transceiver in the body would have been displayed before recalibration.

References Cited

UNITED STATES PATENTS

| | | | |
|---|---|---|---|
| 2,660,054 | 11/1953 | Pringle, Jr. | 73—67.7 |
| 2,937,522 | 5/1960 | McGaughey | 73—67.7 |
| 3,371,524 | 3/1968 | Włoszek | 73—1(A)X |
| 3,407,650 | 10/1968 | Dickinson | 73—67.7 |

OTHER REFERENCES

Publication: Nondestructive Testing Handbook, R. C. McMaster, 1959 (II), TA410 M32, pp. 48.13–16 and 43.37–39.

Publication: Ultrasonic Technology, p. 172, R. Goldman, 1962, TA367G6 CZ.

LOUIS R. PRINCE, Primary Examiner

D. M. YASICH, Assistant Examiner

U.S. Cl. X.R.

73—67.7